Figure 1:
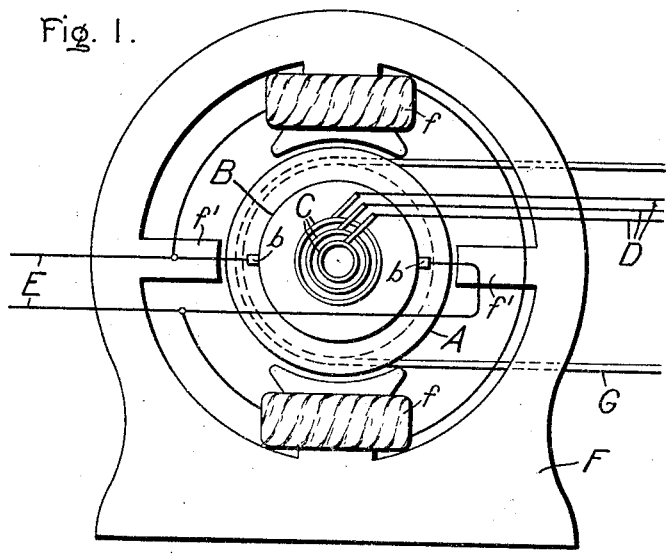

C. P. STEINMETZ.
DYNAMO ELECTRIC MACHINE.
APPLICATION FILED MAR. 20, 1909.

940,210.

Patented Nov. 16, 1909

WITNESSES:
J. Earl Ryan,
J. Ellis Glen.

INVENTOR
CHARLES P. STEINMETZ.
BY
ATTY

UNITED STATES PATENT OFFICE.

CHARLES P. STEINMETZ, OF SCHENECTADY, NEW YORK, ASSIGNOR TO GENERAL ELECTRIC COMPANY, A CORPORATION OF NEW YORK.

DYNAMO-ELECTRIC MACHINE.

940,210.  Specification of Letters Patent.  Patented Nov. 16, 1909.

Application filed March 20, 1909. Serial No. 484,687.

*To all whom it may concern:*

Be it known that I, CHARLES P. STEIN-METZ, a citizen of the United States, residing at Schenectady, county of Schenectady, State of New York, have invented certain new and useful Improvements in Dynamo-Electric Machines, of which the following is a specification.

My invention relates to dynamo-electric machines, and its object is to provide a novel and simple means for improving commutation in certain types of machines.

It is well known in the art that commutation may be improved in either a direct-current motor or generator by means of commutating poles provided with windings adapted to produce a proper magnetization of the commutating poles. It is further well known that the magnetization of the commutating poles must be in the opposite direction to that which would be produced by the armature reaction in either generator or motor,—that is, if the commutating pole were unwound, the magnetization produced in the pole in either a generator or motor would be such as to affect commutation injuriously. I have discovered, however, that in certain classes of machines an armature reaction exists which can be utilized for producing the proper magnetization of a commutating pole so as to improve commutation.

In the ordinary rotary converter the armature ampere turns due to the alternating motor current supplied through the collector rings are approximately equal to the ampere turns of the direct generator current delivered from the commutator, so that armature reaction is almost wholly absent. If, however, the armature of a rotary converter is caused to deliver mechanical power, the magnetizing effects of motor and generator currents are no longer balanced; but the motor current is in excess. Since the armature reaction due to the generator current alone would be in a direction to produce a flux injurious to commutation, it follows that the armature reaction due to the motor current which is in the opposite direction will produce a flux in the proper direction for improving the commutation of the generator current, and since in the case of a rotary converter delivering mechanical power the motor armature reaction is in excess of the generator armature reaction, the commutation of the machine can be improved by placing unwound commutating poles at the points of commutation of the generator current; which poles are magnetized by the resultant armature reaction,—or in other words, by that portion of the armature reaction due to the motor current which is in excess of the armature reaction due to the direct current.

My invention, accordingly, consists of a dynamo-electric machine having an armature provided with a commutator, electrical connections whereby motor current is delivered to, and generator current taken from, said armature, one of the currents flowing through the commutator and being less in amount than the other of said currents, and unwound commutating poles located at the points of commutation of the currents flowing through the commutator and magnetized by the resultant armature reaction.

My invention will best be understood by reference to the accompanying drawings, in which—

Figure 2:
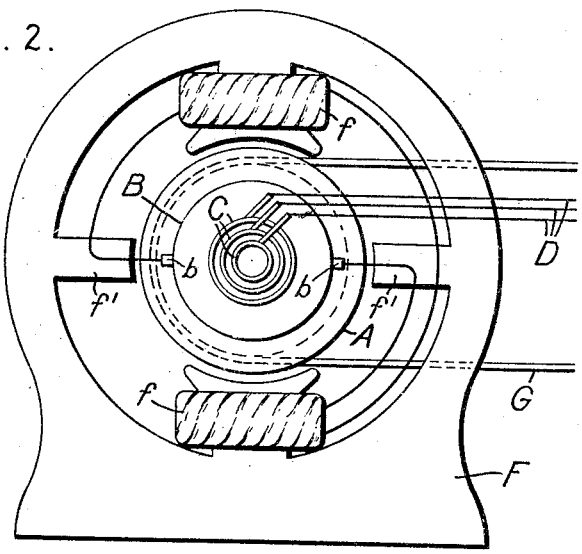

Figure 1 shows diagrammatically a rotary converter arranged in accordance with my invention; and Fig. 2 shows a self-exciting synchronous motor similarly arranged.

In Fig. 1, A represents the armature, which is provided with a commutator B and commutator brushes $b$ $b$. C represents collector rings connected to alternating current leads D. E represents direct-current leads connected to the commutator brushes $b$ $b$. F represents the field magnet having main poles on which are the field coils $f$ $f$, and $f'$ $f'$ represent unwound commutating poles located at the points of commutation of the current flowing through the commutator B. G represents a belt or other mechanical connection through which mechanical power may be taken from and delivered to the armature. If alternating current is being delivered to the armature through the leads D and collector ring C, while direct-current is being taken from the commutator brushes *b b* through leads E and mechanical power is being delivered from the armature through belt G, the armature ampere turns due to the alternating motor current will be in excess of the ampere turns due to the direct generator current by an amount depending on the amount of mechanical power delivered through the belt G. There will, therefore, be a resultant armature reaction, which, as heretofore explained, is in a direction for producing a magnetization of the commutating poles *f'*, which will assist the commutation of the direct current delivered by the machine. Similarly, if direct current is being supplied to the machine through the leads E and commutator B, and alternating current is being delivered by the machine through the collector rings C and leads D while mechanical power is being delivered to the armature through the belt G, the ampere turns due to the alternating generator current will be in excess of the ampere turns due to the direct motor current, and, since, as in any direct current motor, the motor current flowing through the commutator tends to magnetize the commutating poles in the wrong direction, the alternating generator current, the magnetizing effect of which is opposed to that of the direct motor current, produces a magnetization of the commutating poles in the proper direction for improving the commutation of the direct motor current delivered to the machine.

Fig. 2 represents diagrammatically a self-exciting synchronous motor. The arrangement is the same as that of Fig. 1, except that the direct current generated and delivered through the commutator is supplied only to the field coils *f*, and not to any external circuit. The conditions in this machine are precisely the same as those first mentioned in the discussion of Fig. 1,—that is, the alternating motor current being in excess of the direct generator current, produces a magnetization of the commutating poles in the proper direction for improving the commutation of the current delivered through the commutator.

While I have illustrated only two applications of my invention, it will be understood that it is applicable as has been said before, to any machine in which motor current is delivered to and generator current taken from the armature; one of the currents flowing through the commutator and being less in amount than the other current. Consequently, I do not desire to limit myself to the particular construction and connections shown, but aim in the appended claims to cover all modifications which are within the scope of my invention.

What I claim as new and desire to secure by Letters Patent of the United States, is,—

1. A dynamo-electric machine having an armature provided with a commutator, electrical connections whereby motor current is delivered to, and generator current taken from, said armature, one of the currents flowing through the commutator and being less in amount than the other of said currents, and unwound commutating poles located at the points of commutation of the currents flowing through the commutator and magnetized by the resultant armature reaction.

2. A dynamo-electric machine having an armature provided with a commutator, electrical connections whereby motor current is delivered to and generator current taken from the armature, the generator current being taken through the commutator and the motor ampere turns in the armature being in excess of the generator ampere turns, and unwound commutating poles located at the points of commutation of the generator current and magnetized by the resultant armature reaction.

3. A dynamo-electric machine having an armature provided with a commutator, electrical connections whereby motor current is delivered to and generator current taken from the armature, the generator current being taken through the commutator, mechanical connections whereby mechanical power is delivered by the armature, and unwound commutating poles located at the points of commutation of the generator current and magnetized by the resultant armature reaction.

4. A dynamo-electric machine having an armature provided with a commutator, electrical connections whereby motor current is delivered to and generator current taken from the armature, the generator current being taken through the commutator, and unwound commutating poles located at the points of commutation of the generated current and magnetized by the resultant armature reaction.

5. A dynamo-electric machine having an armature provided with a commutator and collector rings, electrical connections to said commutator and collector rings whereby motor current is delivered to and generator current taken from the armature, the armature ampere turns due to the current through the collector rings being in excess of the ampere turns due to the current through the commutator, and unwound commutating poles located at the points of commutation of the current flowing through the commutator.

6. A dynamo-electric machine having an armature provided with a commutator, electrical connections whereby motor current is delivered to and generator current taken from the armature, one of said currents flowing through the commutator, mechanical connections whereby mechanical power is transferred between the armature and another machine, and unwound commutating poles located at the points of commutation of the current flowing through the commutator.

It witness whereof, I have hereunto set my hand this 15th day of March, 1909.

CHARLES P. STEINMETZ.

Witnesses:
 JOSEPH L. R. HAYDEN,
 T. W. NOONAN.